US008898404B2

(12) United States Patent
Obata et al.

(10) Patent No.: US 8,898,404 B2
(45) Date of Patent: Nov. 25, 2014

(54) MEMORY MANAGEMENT METHOD AND COMPUTER

(75) Inventors: Motoki Obata, Toda (JP); Hiroyasu Nishiyama, Kawasaki (JP); Masahiko Adachi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 848 days.

(21) Appl. No.: 12/607,622

(22) Filed: Oct. 28, 2009

(65) Prior Publication Data

US 2010/0250629 A1 Sep. 30, 2010

(30) Foreign Application Priority Data

Mar. 25, 2009 (JP) .................. 2009-073646

(51) Int. Cl.
*G06F 12/00* (2006.01)
*G06F 12/02* (2006.01)
*G06F 12/08* (2006.01)

(52) U.S. Cl.
CPC ............ *G06F 12/0253* (2013.01); *G06F 12/08* (2013.01)
USPC ........................................................ 711/159

(58) Field of Classification Search
USPC ........................................................ 711/159
See application file for complete search history.

(56) References Cited

U.S. PATENT DOCUMENTS

| 4,989,132 | A | * | 1/1991 | Mellender et al. | ............ | 717/139 |
| 6,081,665 | A | * | 6/2000 | Nilsen et al. | .................. | 717/116 |
| 7,340,494 | B1 | * | 3/2008 | Detlefs et al. | ......................... | 1/1 |
| 7,979,659 | B2 | | 7/2011 | Obata et al. | | |
| 2007/0011415 | A1 | * | 1/2007 | Kaakani et al. | ............... | 711/159 |

FOREIGN PATENT DOCUMENTS

JP 2009-037547 2/2009

OTHER PUBLICATIONS

Adachi et al., "Evaluation of Java Virtual Machine with Explicitly Managed Heap Memory," Seventh IEEE Forum on Information Technology, 2008, pp. 85-88 (Translation 16 Sheets).
Pizlo et al., "Real-Time Java Scoped Memory: Design Patterns and Semantics," Proceedings of the Seventh IEEE Internal Symposium on Object-Oriented Real-Time Distributed Computing, 2004, 10 Sheets.
Office action dated Feb. 26, 2013 issued in connection with Japanese Application No. 2009-073646.

* cited by examiner

*Primary Examiner* — Aimee Li
*Assistant Examiner* — Craig Goldschmidt
(74) *Attorney, Agent, or Firm* — Foley & Lardner LLP

(57) ABSTRACT

A memory management method is provided to manage a memory in which areas of a garbage collected Java heap memory and a non-garbage collected external heap memory can be secured, by using a program executed by a processor in a computer. If it is judged that there is no reference to all data arranged in the external heap memory or starting point data of reference relations included in the all data, from data arranged outside the external heap memory, then the external heap memory is judged to be capable of being deallocated. As a result, it becomes possible to implement memory management in which garbage collection needing a long time program stop is not conducted and an additional API is not used.

13 Claims, 17 Drawing Sheets

FIG.2

201 SAMPLE PROGRAM

```
package test;                                    202 public class Sample {               205 private HashMap attributes;          203 public void foo() {              204
            ...
            attributes = new HashMap();
            ...
        }
    }
```

PRIOR ART

FIG.13

```
//List li = new List(); THIS IS THE ORIGINAL          ─1301

ReferenceExplicitMemory em =                          ─1302
        new ReferenceExplicitMemory();

List li = em.newInstance(List.class);                 ─1303

Obj o1 = new Obj();

Obj o2 = new Obj();

li.add(o1); // ref.                                   ─1305
li.add(o2); // ref.

{ ... any operation ... } em.reclaim();                                         ─1304
```

MEMORY MANAGEMENT METHOD AND COMPUTER

The present application claims priority from Japanese application JP 2009-073646 filed on Mar. 25, 2009, the content of which is hereby incorporated by reference into this application.

BACKGROUND OF THE INVENTION

The present invention relates to a memory management technique in a computer program.

In developing a computer program, it is known that paying attention to processes for securing a memory area to be used when executing a program and for deallocating the memory area is a burden for a programmer and would cause errors (or defect) in programming. For example, in the C/C++ language, which is a typical language, the user needs to explicitly describe the securing and reclamation required to execute a program, and program defects are frequently caused by this. As examples of the program defect, a memory leak caused by forgetting to deallocate a secured memory area, and an illegal reference to a deallocated memory area (that data to be originally referenced does not exist in a reference destination) can be mentioned. The program developer must develop a program while always paying attention to the utilization states of memories. Because of program development conducted by a plurality of persons and enlargement of program codes, however, it is becoming difficult to describe the securing and reclamation of all memories accurately.

As means for solving this, utilization of a garbage collector, which automatizes memory arrangement in a program, can be mentioned. In Java (trademark), which is one of language processing systems for conducting memory management by utilizing a garbage collector, an API (Application Program Interface) for memory securing at the time of program execution is prepared. However, an API for deallocation does not exist. Deallocation of a memory area secured in the process of program execution is conducted by a garbage collector mounted on a Java virtual machine, which executes a Java program. Garbage collection (hereafter referred to as "GC" as well) executed by the garbage collector frequently assumes an implementation form in which all Java program execution threads are stopped and unnecessary data are withdrawn.

The time when the Java virtual machine starts GC is immediately before the use quantity of a Java heap memory, which stores data (Java object) generated on the Java program, exceeds a certain threshold. However, it is difficult for the user to estimate the memory use quantity required for program execution, and it is also difficult to foresee the timing of exceeding the threshold. Therefore, it is also difficult for the user to foresee the start of GC in response to exceeding the threshold. As a result, the program in execution stops at irregular intervals.

In generational garbage collection, which is often adopted as the GC implementation scheme in the Java virtual machine, the scenarios of GC that needs a short time for stopping Java program execution threads and GC that needs a long time for stopping Java program execution threads may occur. However, it is difficult to foresee which of the GCs occurs the next time. In recent years, Java systems have begun to' be used on the server sides and built-in fields (such as industrial devices and home electric appliances). However, it has become regarded as a problem that the response of the whole system disappears if a long time program stop is caused by unexpected GC.

Methods for solving this problem are disclosed in, for example, F. Pizlo, J. M. Fox, D. Holmes and J. Vitek, "Real-Time Java Scoped Memory: Design Patterns and Semantics," Proceedings of the Seventh IEEE Internal Symposium on Object-Oriented Real-Time Distributed Computing, 2004, and Masahiko Adachi, Motoki Obata, Hiroyasu Nishiyama, Koichi Okada, Kei Nakajima, "Evaluation of Java Virtual Machine with Explicitly Managed Heap Memory," Seventh IEEE Forum on Information Technology (FIT 2008), 2008. In the methods disclosed in these documents, a non-garbage collected heap memory (hereafter referred to "external heap memory") is included besides a garbage collected heap memory subjected to garbage collection conducted by the Java virtual machine (hereafter referred to as "Java heap memory"). The external heap memory is a memory area that can be subjected to memory management by the program. In other words, securing of the external heap memory, generation of an object and deallocation of the external heap memory follow description in the source code in the program generated by the programmer.

In reclamation of the external heap memory area according to the technique disclosed in the Pizlo's document, a restriction is placed on the reference relation of data generated in a secured memory area in order to deallocate the memory area with a low overhead. This restriction aims at ensuring that program execution is not influenced even if the area is deallocated together with data at the time when any thread for generating data has not been left in the external heap memory. In this way, occurrence of a long time stop of the Java program execution thread is suppressed by using an area that can be subjected to memory area management conducted by the program, i.e., the external heap memory, which is non-garbage collected heap memory, and that is not subjected to garbage collection conducted by the Java virtual machine, and placing a restriction on the reference relation of data. However, this restriction item hampers the convenience of the external heap memory remarkably.

Because of the restriction on the reference relation between data, it is necessary for the user to conduct programming while always paying attention to the reference relation between data. However, it can be said that it is extremely difficult to completely grasp the reference relation on the memory because of the enlargement of the program scale or occurrence of implicit data generation, which is not described on the user program (data generation conducted by a program that is not described by the user). If a reference relation violating the restriction has occurred as a result of a check at the time of execution concerning the restriction item, then "exception" occurs and the program is not executed normally in many cases. In addition, it is also a problem that remarkable performance degradation is caused by the check processing as compared with the execution performance of the program in the case where the external heap memory is not used.

According to the technique disclosed in the Adachi's document, it is made possible to utilize the external heap memory area without placing a restriction on a reference relation between objects, in order to cope with the above-described problems. The restriction item on the reference relation in the technique disclosed in the Pizlo's document aims at conducting deallocation of the external heap memory area safely. On the other hand, according to the technique disclosed in the Adachi's document, when deallocating the external heap memory area, a reference relation between data in a memory area to be deallocated and data in a memory area to be not deallocated is examined and data in the memory area to be deallocated that is required for later execution is moved to the memory area to be not deallocated. After it is thus ensured that deallocation of the memory area to be deallocated will not constitute a hindrance to execution of the program, the memory area to be deallocated is deallocated. As a result, the API for external heap memory can be utilized without worrying about the reference relation between data. In addition, since the investigation of the reference relation is conducted only at the time of deallocation of the memory area, the check is not necessary at the time of execution concerning the restriction item.

FIG. 13 is a diagram showing a program to be used when utilizing the external heap memory in the API. The program shown in FIG. 13 is an example that generates data in the List class and makes it possible to reference data of and o2 in Object class from the data in the List class. In the original program, the "new" operator is used to generate data in the List class as in an executable statement shown in a line 1301 provided with a comment. In order to utilize the external heap memory, however, a change to executable statements as shown in lines 1302 and 1303 is made.

The line 1302 is an executable statement for ordering generation of an external memory. Here, data in the ReferenceExplicitMemory class is generated, and a non-garbage collected external heap memory is generated. In an executable statement indicated in the next line 1303, data in the List class is generated for the generated external heap memory. Furthermore, an executable statement for an order of deallocation (deletion) of the generated external heap memory is indicated in a line 1304. If the executable statement indicated in the line 1304 is executed, then the external heap memory generated by the executable statement indicated in the line 1302 is deallocated. If at that time there is a reference to data in the external heap memory from an area other than the external heap memory to be deallocated, then reclamation is conducted after the data group that is being referenced is moved to a memory that is not to be deallocated.

There are two kinds in the method for disposing data into the external heap memory. One of them is a method for disposing all data generated in a certain section in the external heap memory, and the other is a method for disposing only data that can be referenced from among data associated with the external heap memory (associated for arrangement) in the external heap memory. A description for utilizing an external heap memory of a type in which data is disposed by utilizing the latter cited reference relation is shown in FIG. 13. The data generation statement for the external heap memory indicated in the line 1303 is regarded as association with the external heap memory generated by the executable statement indicated in the line 1302.

FIG. 17 is a diagram showing an image of memories and data immediately before executing an executable statement indicated by a line 1305 in FIG. 13. Data li (reference numeral 1701) in the List class generated by the executable statement indicated in the line 1303 is disposed in the external heap memory 112 which is generated by the executable statement indicated in the line 1302. Data o1 (reference numeral 1702) and o2 (reference numeral 1703) in the Obj class are generated in the Java heap memory 111. As other data, data E (reference numeral 1704-1) and F (1704-2) are also disposed in the Java heap memory 111. An arrow 1705 between data represents a reference relation between data. If the executable statement indicated in the line 1305 in FIG. 13 is executed in this state, then it becomes possible to reference the data o1 (reference numeral 1702) and o2 (reference numeral 1703) from the data li (reference numeral 1701) associated with the external heap memory 112. This state is shown in FIG. 18.

In FIG. 18, references to the data o1 (the reference numeral 1702) and o2 (the reference numeral 1703) from the data li (the reference numeral 1701) are indicated by arrows 1801 and 1802, respectively. Thereafter, the data o1 (the reference numeral 1702) and o2 (the reference numeral 1703) are moved to the external heap memory 112 in response to a certain opportunity. As the certain opportunity, garbage collection or an excess of the memory use quantity over a threshold is considerable. An image of the data o1 and o2 after the movement is shown in FIG. 19. The data o1 and o2 that can be referenced from the data li (the reference numeral 1701) associated with the external heap memory 112 are moved into the external heap memory 112 as represented by reference numerals 1901 and 1902, respectively. It is now supposed that the executable statement for deallocating the external heap memory 112 indicated in the line 1304 is executed. If the external heap memory 112 is deallocated in the state shown in FIG. 19 and its internal data are deleted, then a reference to the data o2 (the reference numeral 1902) from the data F (reference numeral 1704-2) becomes illegal and the later execution result cannot be ensured.

If there is a reference to the external heap memory 112 (the memory that is to be deallocated) from the Java heap memory (the memory that is not to be deallocated) as represented by an arrow 1707, therefore, the referenced data o2 (the reference numeral 1902) in the external heap memory 112 (the memory that is to be deallocated) is moved (copied) into the Java heap memory (the memory that is not to be deallocated). The state after the movement (copy) is shown in FIG. 20. In FIG. 20, the data o2 (the reference numeral 1902) is moved (copied) to data o2' (reference numeral 2001), and the arrow 1707, which indicates the reference from the data F (the reference numeral 1704-2), is also changed to a new arrow 2002. Since the data o2 (the reference numeral 1902) and the data o2' (reference numeral 2001) are the same data, a reference to the data o2' (the reference numeral 2001) from the data F (the reference numeral 1704-2) is similar to the reference to the original data o2 (the reference numeral 1902) from the data F (the reference numeral 1704-2). It can be ensured that there is no influence upon the result of later execution even if the data li (the reference numeral 1701), o1 (the reference numeral 1901) and o2 (the reference numeral 1902) are deleted together with the external heap memory 112.

SUMMARY OF THE INVENTION

When utilizing an external heap memory of a type in which data (for example, the data o1 (the reference numeral 1901) shown in FIG. 19) that can be referenced from data (for example, the data li (the reference numeral 1701) shown in FIG. 19) associated with the external memory is disposed, it is necessary to describe a dedicated API as a data disposition method in the external heap memory. For describing the API suitably, it is necessary to grasp the program structure and object arrangement and there is a fear that the program development period will become long. Especially as regards the description of deallocation of the external heap memory, data having a possibility of becoming necessary in later execution is moved to an area to be not deallocated including a garbage collected memory area. If a description is made in an unsuitable place, therefore, there is a fear that many of data in the area to be deallocated will flow to an area to be not deallocated and consequently garbage collection that needs a long time stop will be induced.

Even if an API is described, the API cannot be utilized in a processing system that does not correspond to the API, resulting in lowered portability. In addition, in the case where a source program is not distributed or in the case where program alteration is impossible because of a restriction such as a license, an external heap memory cannot be utilized and consequently the number of applicable programs becomes small.

The present invention has been made in view of the problems, and an object thereof is to implement memory management in which garbage collection needing a long time program stop is not conducted and an additional API is not used.

The present invention provides a memory management method for managing a memory in which areas of a garbage collected memory and a non-garbage collected memory can be secured, by using a program executed by a processor in a computer.

If it is judged that there is no reference to all data arranged in the non-garbage collected memory or starting point data of reference relations included in the all data, from data arranged outside the non-garbage collected memory, then the non-garbage collected memory is judged to be capable of being deallocated.

Other means will be described later.

According to the present invention, it is possible to implement memory management in which garbage collection needing a long time program stop is not conducted and an additional API is not used.

Other objects, features and advantages of the invention will become apparent from the following description of the embodiments of the invention taken in conjunction with the accompanying drawings.

BRIEF DESCRIPTION OF THE DRAWINGS

FIG. 2 is a diagram showing an example of a sample program of Java;

FIG. 13 is a diagram showing a program in the case where an external heap memory is utilized in an API;

DESCRIPTION OF THE EMBODIMENTS

Figure 1:
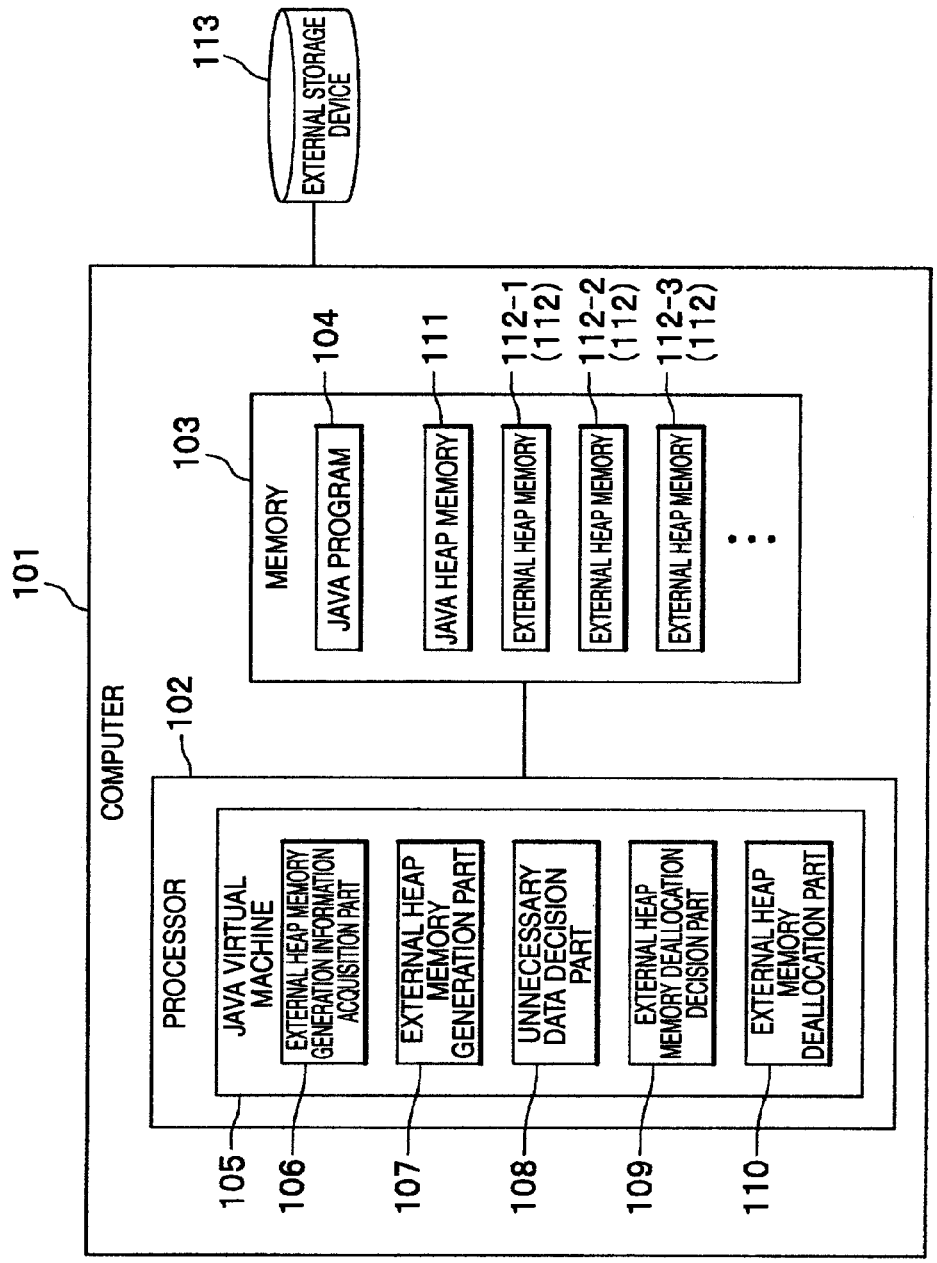
FIG. 1 is a configuration diagram of a computer and an external storage device according to an embodiment.

An embodiment for executing a memory management method according to the present invention will now be described with reference to the drawings. The same configuration and processing extending over a plurality of drawings are denoted by like reference numerals, and duplicated description will be omitted suitably. The present embodiment is description for the case where the present invention is applied to the Java language. However, the present embodiment is effective for other languages having the garbage collection function as well.

As shown in FIG. 1, a computer 101 includes a processor 102 for executing processing and a memory 103.

A Java virtual machine 105 includes an external heap memory generation information acquisition part 106, an external heap memory generation part 107, an unnecessary data decision part 108, an external heap memory deallocation decision part 109, and an external heap memory deallocation part 110.

A Java program 104 executed by a Java virtual machine 105, which is executed on the processor 102, is stored in the memory 103. A Java heap memory 111, which is a garbage collected memory area to be used by the Java virtual machine 105, and an external heap memory 112 (112-1, 2 and 3), which is non garbage collected memory, are secured (generated) in the memory 103.

As many external heap memories 112 as the number of times of execution of an external heap memory generation statement described on the Java program 104, or an external heap memory generation byte code generated on the basis of information acquired by the external heap memory generation information acquisition part 106 included in the Java virtual machine 105, are generated. By the way, the Java program 104 may be recorded not on the memory 103, but in an external storage device 113 connected to the computer 101. In the Java program 104, only the conventional processing (processing other than features of the present invention) is described, or description concerning generation of the external heap memory 112 and association of data with the external heap memory 112 is added. If only the conventional processing is described, the external heap memory generation information acquisition part 106 acquires information concerning an external heap memory generation place and data to be associated with the external heap memory. Hereafter, data associated with the external heap memory 112 is described as "starting point data on the reference relation" or simply "starting point data."

In order to execute the Java program 104, the Java virtual machine 105, which has read a byte code generated by compiling the Java program 104, causes the external heap memory generation information acquisition part 106 to read external heap generation information. When a byte code for generating an external heap memory is executed, the Java virtual machine 105 causes the external heap memory generation part 107 to generate the external heap memory 112. The Java virtual machine 105 generates data that can be referenced from starting point data on the reference relation associated with the external heap memory 112, directly in the external heap memory 112, or generates the data in the Java heap memory 111, which is the garbage collected memory. If the reference relations are maintained when garbage collection has been conducted several times after generation of the data in the Java heap memory 111, then the Java virtual machine 105 moves the data into the external heap memory 112 to arrange those data in the external heap memory 112.

During the execution of the Java program 104, the Java virtual machine 105 causes the unnecessary data decision part 108 to convert unnecessary data in the Java heap memory 111, which is the garbage collected memory, to different data having no reference to other data. In addition, the Java virtual machine 105 executes the external heap memory deallocation decision part 109. If as regards the external heap memory 112 there are no references to all data in the external heap memory 112 or starting point data associated with the external heap memory, then the Java virtual machine 105 judges that the external heap memory 112 can be deallocated and causes the external heap memory deallocation part 110 to deallocate the external heap memory 112. If there is a reference to the external heap memory 112 (a memory to be deallocated) from the Java heap memory 111 (a memory to be not deallocated) at that time, then the Java virtual machine 105 moves a data group that can be referenced directly or indirectly to the Java heap memory (the memory to be not deallocated) and thereby prevents a result of later execution from being influenced.

The external heap memory generation information acquisition part 106 will now be described with reference to a sample program 201 shown in FIG. 2. A Sample class 202 belonging to a test package is described in the sample program 201. A foo method 203 is described in the class. In the foo method 203, processing for generating data in a HashMap class and referencing the data from an attributes field 205 is conducted in a statement indicated in a line 204.

It is now supposed to be desired to associate the HashMap data with the external heap memory 112 and set the HashMap data as starting point data. As its method, a class name of data desired to be set as the starting point data and a method name for generating the data are described in a place where the Java virtual machine 105 can read, such as, for example, a different file in a form as indicated in a place denoted by reference numeral 301 in FIG. 3, and they are read at the time of execution by the Java virtual machine 105. In the file, a class name of starting point data concerning the external heap memory 112 and a method name for generating the data are described in the cited order in parentheses with "," between to mark off. Taking the sample program 201 as an example, a class "java.util.HashMap" of the starting point data is described as indicated in a place denoted by reference numeral 302 and the foo method in the Sample class belonging to the test package for generating the present data is described as indicated in a place denoted by reference numeral 303.

When executing the processing statement indicated in the line 204, the Java virtual machine 105 which has read the description in the place 301 generates one external heap memory 112, generates HashMap data as well, and recognizes that the HashMap data is associated with the generated external heap memory 112. By the way, this description may be a starting option (hereafter referred to simply as "option" as well) for the Java virtual machine 105, and FIG. 4 shows its example.

Figure 4:
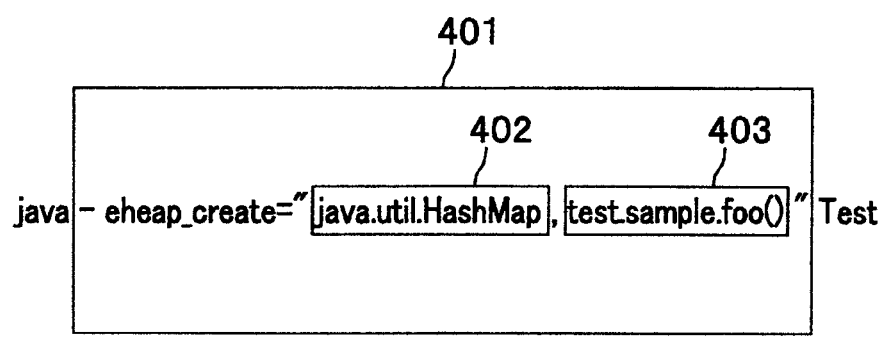
FIG. 4 is a diagram showing an example of description of starting point data and data generation method information into a starting option.

FIG. 4 shows an example in which the class name of starting point data is described as indicated in a place denoted by reference numeral 402 and the method name for generating the data is described as indicated in a place denoted by reference numeral 403 as an external heap memory generation information order option "-eheap_create" (reference numeral 401) for description for operating the main method in the Sample class on the Java virtual machine 105. The starting point data and the generation method name of the data have been obtained by taking the sample program as an example.

Figure 3:
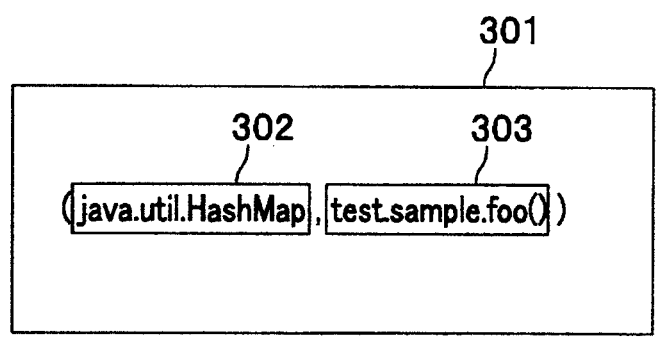
FIG. 3 is a diagram showing an example of description of starting point data and data generation method information into an external input file.
Figure 5:
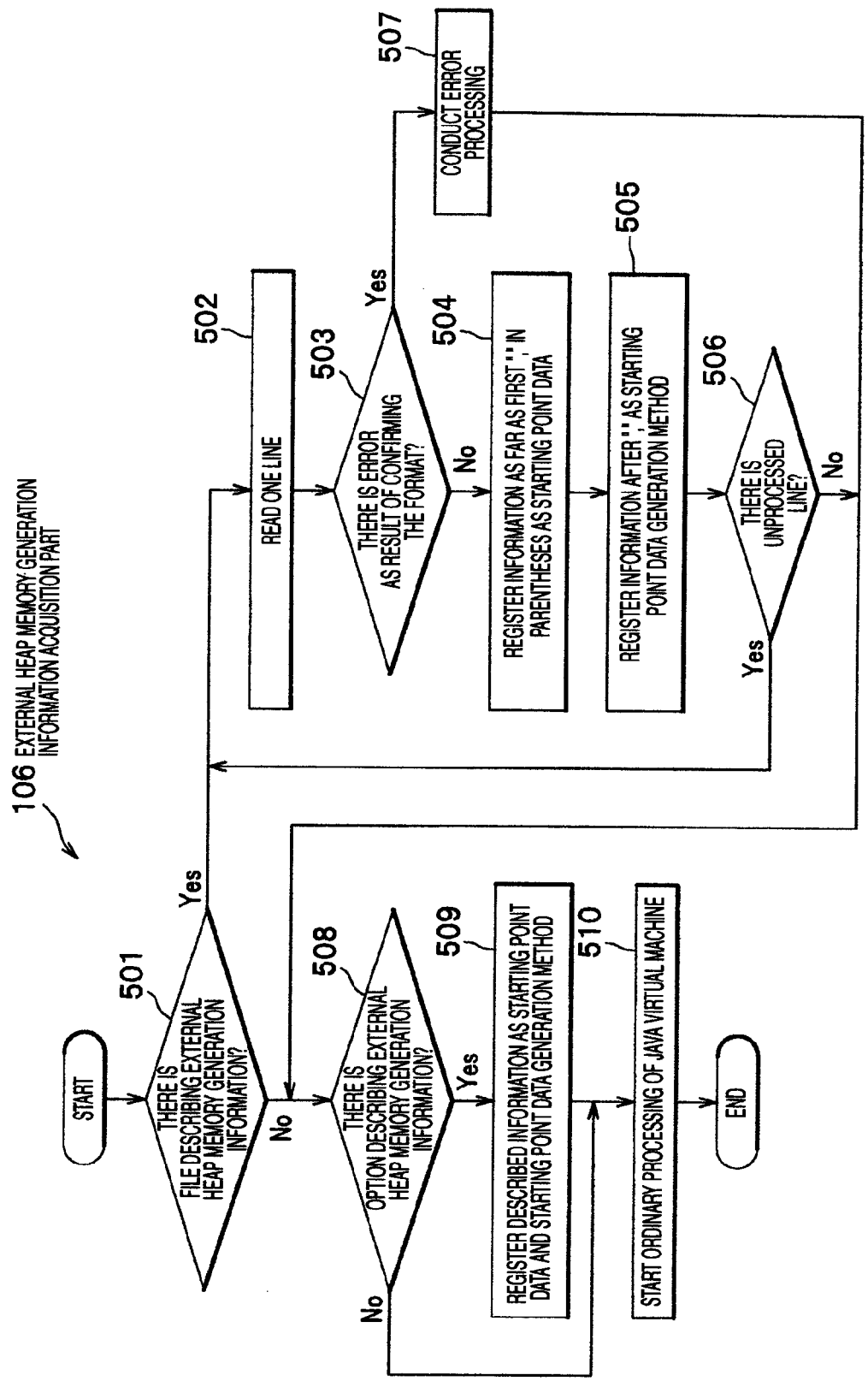
FIG. 5 is a diagram showing a flow chart of an algorithm for reading the starting point data and data generation method information from the external input file and the starting option.

Processing conducted by the external heap memory generation information acquisition part 106 to read information concerning the starting point data and the method for generating the data shown in FIG. 3 and FIG. 4 into the Java virtual machine 105 is shown in FIG. 5. It is supposed that processing 501 to 509 is conducted immediately after the Java virtual machine 105 is started and the conventional processing (processing 510) of the Java virtual machine is not yet started.

First, in processing 501, it is checked whether there is a file that describes external heap memory generation information as shown in FIG. 3. If there is such a file (Yes in the processing 501), then in processing 502 one line is first read, and in processing 503 a decision is made whether there is an error by confirming the format. If there is no error (No in the processing 503), then information as far as first "," in the parentheses is registered as starting point data (class name of the starting point data) in processing 504 and information after "," is registered as starting point data generation method in processing 505.

Thereafter, a decision is made in processing 506 whether there is unprocessed data (line). If there is unprocessed data (Yes), then the processing returns to the processing 502. If there isn't unprocessed data (No), then the processing proceeds to processing 508.

If there is an error (Yes) in the processing 503, then error processing is conducted in processing 507 and processing proceeds to processing 508 without reading the file.

In processing 508, a decision is made whether the option describing the external heap memory generation information as shown in FIG. 4 is specified. If there is the option (Yes), then the described information is registered as information concerning the class name of starting point data and the method name for generating the data in processing 509. After No in the processing 508 or after the processing 509, the ordinary processing of the Java virtual machine 105 is started in processing 510.

Figure 6:
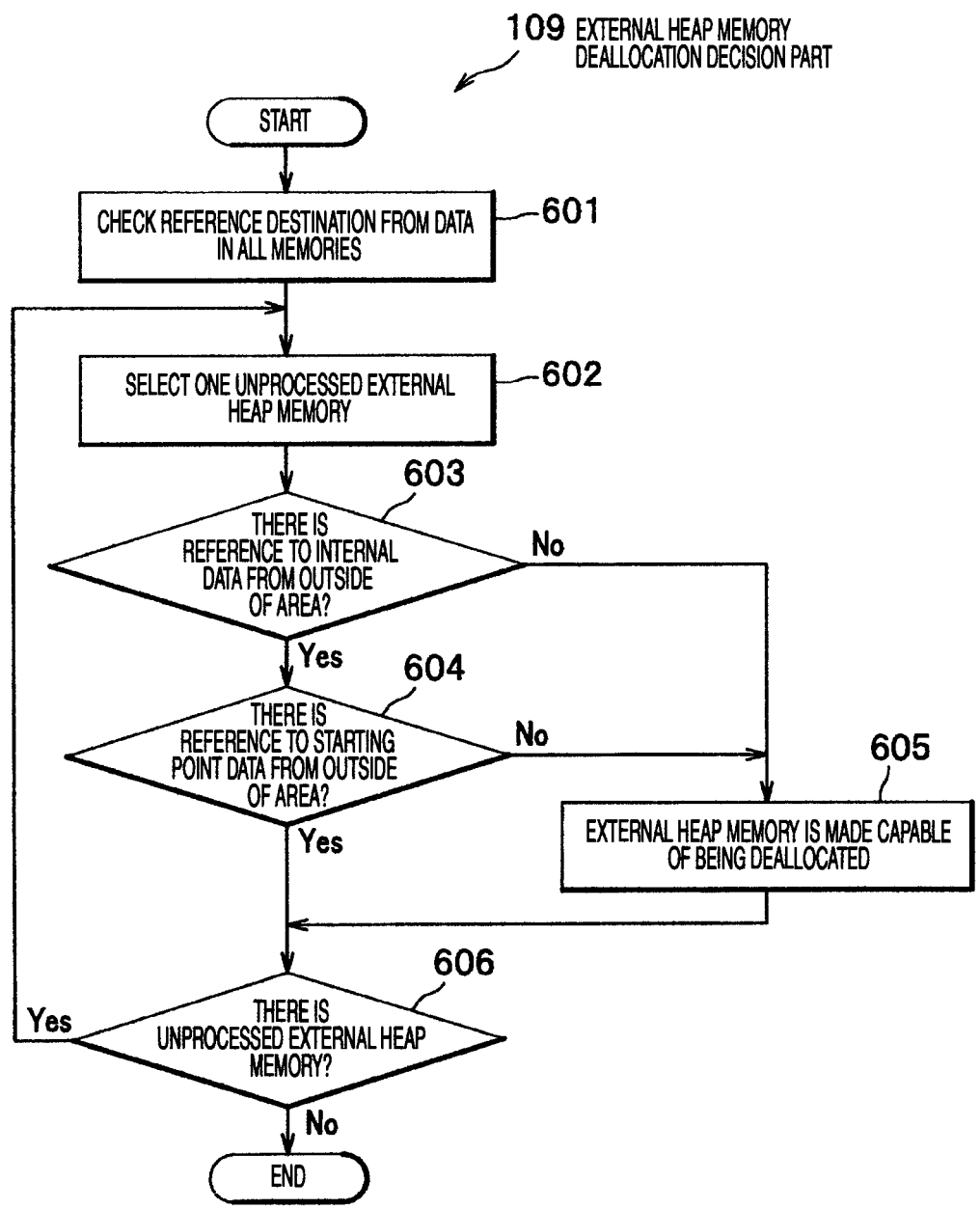
FIG. 6 is a diagram showing a flow chart of an algorithm for making a decision whether to deallocate an external heap memory.

The external heap memory deallocation decision part 109 will now be described. As shown in FIG. 6, first, a decision is made in processing 601 which area is a reference destination from data in all available memories, i.e., the Java heap memory 111 and the external heap memory 112. In processing 602, one external heap memory 112 is selected. In processing 603, a decision is made on the basis of a result obtained in the processing 601 whether there is at least one reference to data in the selected external heap memory 112.

If there is no reference (No in the processing 603), then the processing proceeds to processing 605 and the selected external heap memory 112 is made capable of being deallocated. If there is a reference (Yes in the processing 603), then the processing proceeds to processing 604 and a decision is made whether there is a reference to starting point data associated with the selected external heap memory 112. If there is no reference (No in the processing 604), then the processing proceeds to the processing 605 and the selected external heap memory 112 is made capable of being deallocated. If there is a reference (Yes in the processing 604), then a decision is made in processing 606 whether there is an unprocessed external heap memory 112. If there is an unprocessed external heap memory 112 (Yes in the processing 606), then the processing returns to the processing 602 and the series of processing is repeated. At the time when the decision processing for all external heap memories 112 has been finished (No in the processing 606), the processing is finished.

Figure 7:
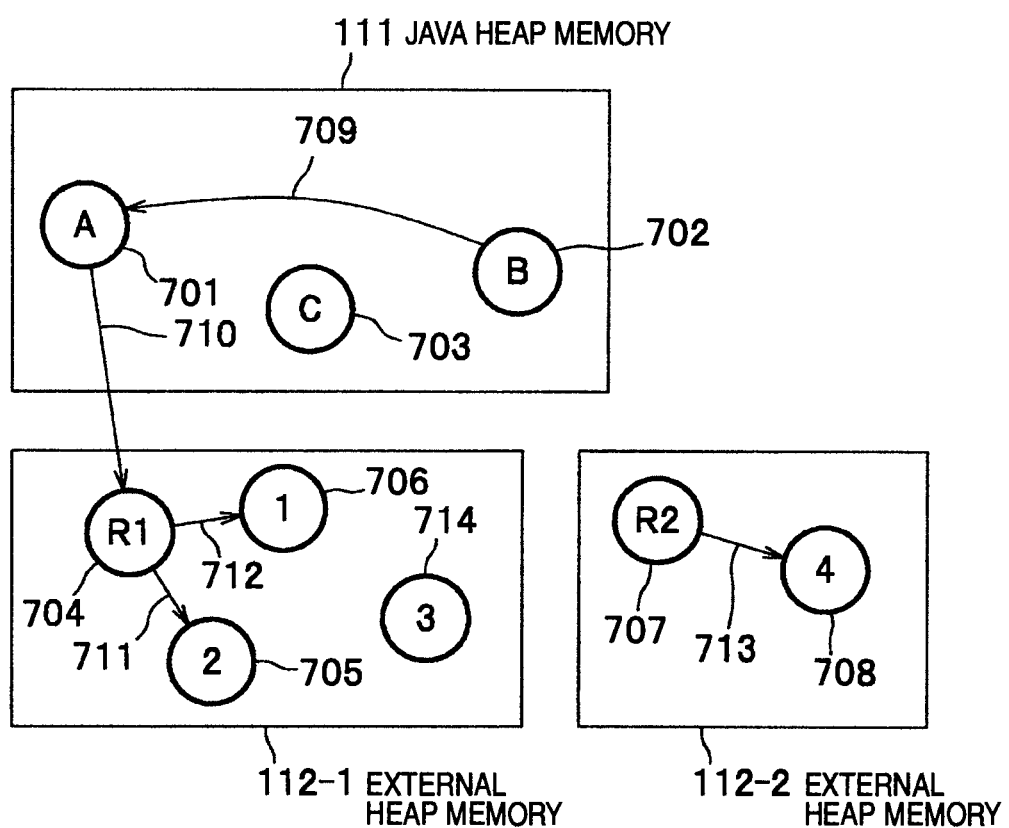
FIG. 7 is a diagram showing an example of data arrangement in a Java heap memory and an external heap memory.

By the way, an execution opportunity for the processing shown in FIG. 6 may be determined to be a starting of a program (i.e. a starting option) for the garbage collection processing, an excess of the total value of sizes of the external heap memory 112 over a predetermined threshold, or an excess of a usage ratio for an available area in the memory 103 over a predetermined threshold. A data arrangement example in the memory 103 obtained when the processing shown in FIG. 6 is executed will now be described with reference to FIG. 7. In a memory image shown in FIG. 7, two external heap memories 112-1 and 112-2 are already secured in addition to the Java heap memory 111, which is the garbage collected memory area. Data A, B and C (reference numerals 701, 702 and 703, respectively) are arranged in the Java heap memory 111. Data R1, 1, 2 and 3 (reference numerals 704, 706, 705 and 714, respectively) are arranged in the external heap memory 112-1. Data R2 and 4 (reference numerals 707 and 708, respectively) are arranged in the external heap memory 112-2.

Starting point data on a reference relation associated with the external heap memory 112-1 is the data R1 (the reference numeral 704). Starting point data concerning the external heap memory 112-2 is the data R2 (the reference numeral 707). Arrows 709 to 713 represent reference relations between data. In such a situation, reference destinations of data in all memories are first checked in the processing 601. As a result, reference relations as indicated by the arrows 709 to 713 in FIG. 7 can be grasped.

Then, one external heap memory is selected in the processing 602. It is now supposed that the external heap memory 112-1 is selected. A decision is made in the processing 603 whether there is a reference to internal data in the external heap memory 112-1 from data external to the external heap memory 112-1. As a result, a reference to the data R1 (the reference numeral 704) from the data A (the reference numeral 701) and represented by the arrow 710 is detected (Yes in the processing 603). Therefore, the processing proceeds to the processing 604.

In the processing 604, a reference to the starting point data R1 from outside of the area is checked. The arrow 710 described above comes under it. Therefore, the result of the processing 606 becomes "Yes" and the next external heap memory 112-2 is selected in the processing 602. The processing 603 is executed again. Since there is no reference to the data R2 (the reference numeral 707) and the data 4 (the reference numeral 708) in the external heap memory 112-2 from the external (No in the processing 603), the external heap memory 112-2 is made capable of being deallocated in the processing 605. As a result of the series of processing, the external heap memory 112-2 out of the two external heap memories 112-1 and 112-2 becomes capable of being deallocated.

In order to reduce the burden of the processing, only one of the processing 603 and the processing 604 may be executed. For increasing the number of the external heap memories 112 regarded as capable of being deallocated as a result of the "decision whether there is a reference to starting point data" in the processing 604 out of the processing 603 and the processing 604 which are decisions concerning whether there is a reference, it is demanded to reduce references to starting point data, for example, data such as the data R1 (the reference numeral 704) and the data R2 (the reference numeral 707) shown in FIG. 7. For making a decision as to the necessity of a reference from data that references the starting point data, for example, the data A in FIG. 7, however, it is necessary to make a decision whether the data A is required in ensuing execution.

If the data A is disposed in a garbage collected memory area, for example, an area that exists in the Java heap memory 111 where a decision can be made as to the necessity of data only by garbage collection conducted by stopping the Java program for a long time, then a garbage collection that needs a long time stop is very unlikely to occur because of utilization of the external heap memory 112 and consequently it is expected that the decision as to the necessity of the data A will not be made for a long time. In the generational GC technique adopted in the typical Java virtual machine, the Java heap memory 111 is divided into a new area and an old area to reduce the GC time. The old area in the two areas is the area where the decision as to the necessity of data cannot be made unless the GC that needs a long time stop described above is not generated.

Figure 8:
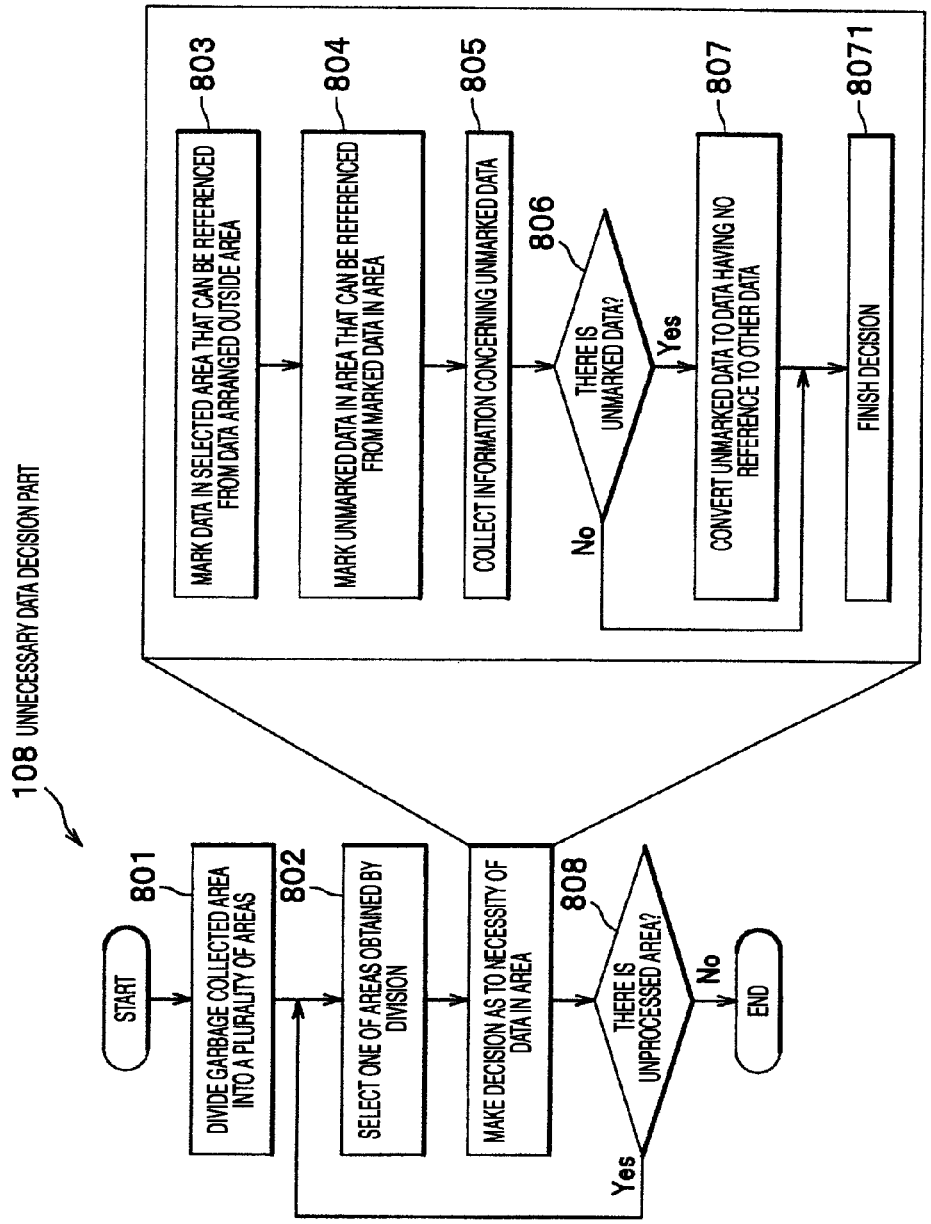
FIG. 8 is a diagram showing a flow chart of an algorithm for making a decision as to necessity of data that involves division of a garbage collected area.

As a method for solving such a problem, an area where a decision cannot be made as to the necessity of data unless a GC that needs a long time stop is generated, such as the old area is divided into a plurality of areas, and with respect to each of the areas, the unnecessary data decision part 108 makes a decision as to the necessity of its internal data. The unnecessary data decision part 108 will now be described. As shown in FIG. 8, the garbage collected area (the Java heap memory 111) is first divided into a plurality of areas in processing 801. The size of division is specified in an option of the Java virtual machine 105 or an external input file.

In processing 802, one of areas obtained by the division is selected. Data necessity decision processing in processing 803 to 807 is conducted on data in the area. In processing 803, references to data in the area from data outside the selected area are checked and data in the area that can be referenced are marked. Then in processing 804, processing for marking unmarked data in the area that can be referenced from the marked data in the area is conducted. Data in the area that can be referenced directly or indirectly from data external to the selected area are marked by executing the processing 803 and the processing 804. In processing 805, information concerning unmarked data included in data in the selected area is collected.

In processing 806, a decision is made whether there is unmarked data. If there is unmarked data (Yes), then unmarked data is converted to different data having no reference to other data in processing 807. It is determined that the unmarked data extracted in the processing 805 is data that cannot be referenced from any other data and is data that is at least unnecessary in the later execution. Therefore, there is no problem even if the unmarked data extracted in the processing 805 is converted to different data. After "No" is obtained in the processing 806 or after the processing 807, the decision is finished in processing 8071.

Then, in processing 808, it is checked whether there is an unprocessed area. If there is an unprocessed area (Yes), then the processing returns to the processing 802. If there isn't unprocessed area (No), then the data necessity decision processing on the garbage collected area (the processing shown in FIG. 8) is finished. Unnecessary references between data can be removed by the processing shown in FIG. 8. As a result, it can be anticipated that a reference to starting point data associated with the external heap memory 112 is removed. It has been described that data that can be judged to be unnecessary is converted to different data having no reference in the processing 807. Alternatively, however, it is also possible to use a method of substituting data that indicates no reference to any data into a place having a reference to other data, or a method of providing a reference itself with an attribute indicating that the reference is an unnecessary reference and utilizing the information at the time of use.

The processing shown in FIG. 8 may be executed at any time. However, execution at the time when GC is finished or the actual use quantity has exceeded a threshold for a memory use quantity is considered to be practical. As for the threshold, the total size value of the external heap memory 112 or a use ratio to the available area in the memory 103 is considerable.

Figure 9:
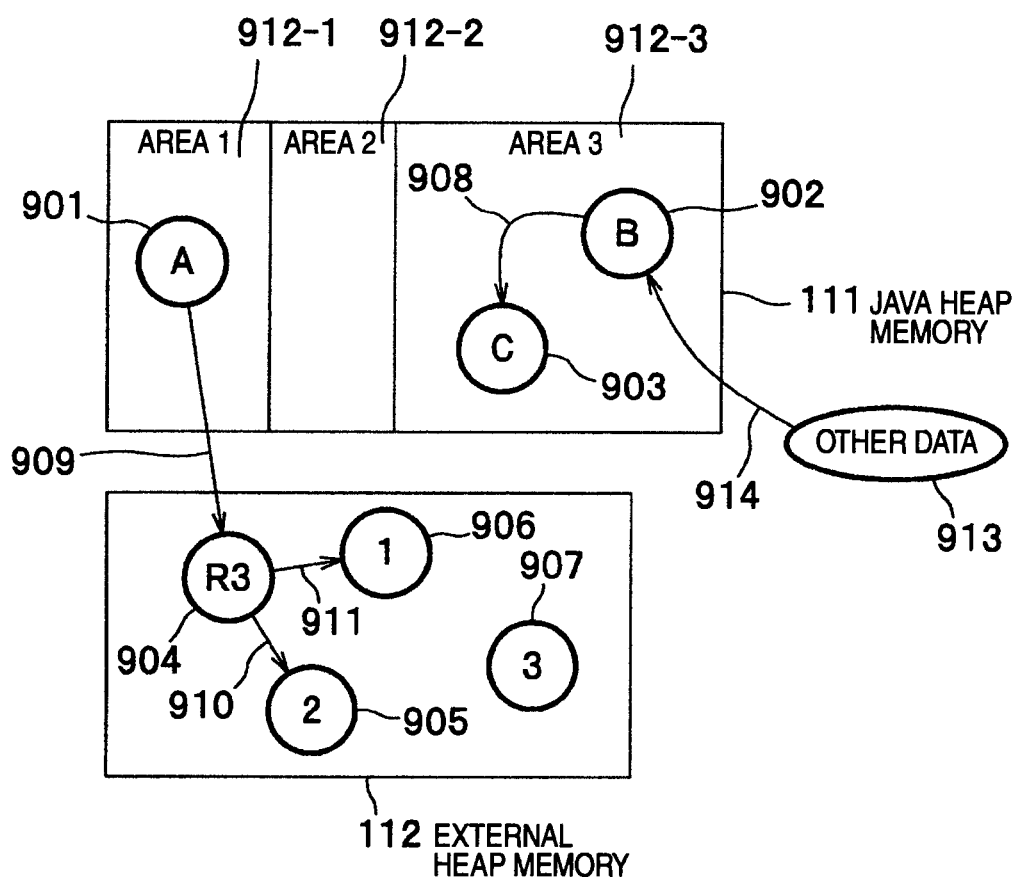
FIG. 9 is a diagram showing an example of data arrangement in a Java heap memory and an external heap memory.

An example of data arrangement in the memory 103 obtained when the processing shown in FIG. 8 is executed will now be described with reference to FIG. 9. As shown in FIG. 9, there are a Java heap memory 111 and an external heap memory 112. Reference numerals 901 to 907 denote data, and arrows 908 to 911 represent reference relations between data. It is supposed that data B (reference numeral 902) has a reference (an arrow 914) from other data 913 that is data in another area (for example, a part on the memory 103 called GC route such as a stack frame or a register, or another external heap memory 112).

First, the Java heap memory 111, which is a garbage collected area, is divided in the processing 801. Here, the Java heap memory 111 is divided into three areas. In FIG. 9, reference numeral 912-1 denotes an area 1, reference numeral 912-2 denotes an area 2, and reference numeral 912-3 denotes an area 3.

Then, in the processing 802, one of the areas obtained by the division is selected. It is now supposed that the area 1 (the reference numeral 912-1) is selected. In the processing 803, a reference to data A in the area 1 from data in an area other than the area 1 is checked. As a result, the data A is not referenced from data in other areas at all. Therefore, the data A is not provided with a mark which indicates that the data is referenced from other data. Therefore, the processing 804 is not executed, and the processing proceeds to the processing 805 and 806. Since the data A hasn't a mark, the processing proceeds to the processing 807. Since a reference to the data A is not from any data at this time point, the data A is replaced by different data having no reference to other data, i.e., having no reference to data R3 (the reference numeral 904). Processing for the area 1 is thus finished. Similar processing is conducted on the area 2 (the reference numeral 912-2) and the area 3 (the reference numeral 912-3).

Figure 10:
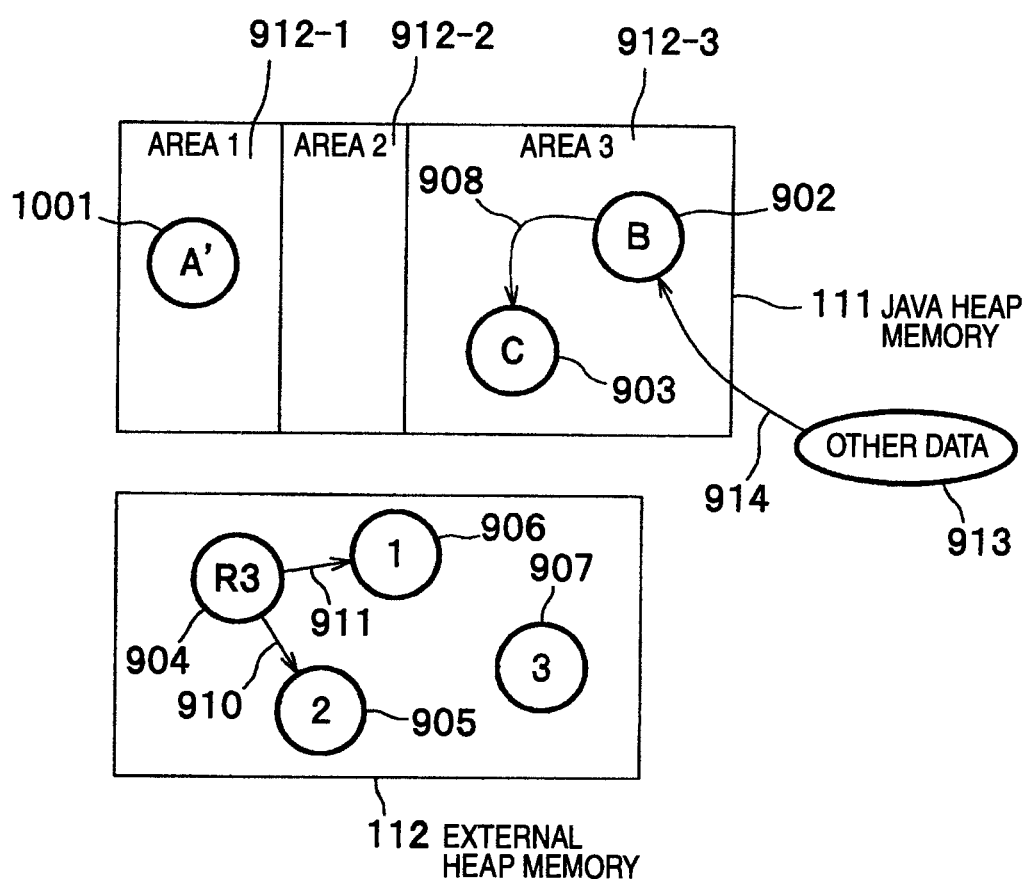
FIG. 10 is a diagram showing a data arrangement obtained after the flow chart shown in FIG. 8 is applied to the data arrangement example shown in FIG. 9.

Since data is not present in the area 2, processing is conducted on the area 3. The data B is marked in the processing 803, and the data C is marked in the processing 804. In the processing 805, it is found that both the data B and C in the area 3 have already been marked and there are no unmarked data, and the processing is finished. An image of data arrangement at this time point is shown in FIG. 10. It is appreciated that the data A (the reference numeral 901 in FIG. 9) is changed to data A' (reference numeral 1001) and the reference represented by the arrow 909 in FIG. 9 has disappeared. Even if the external heap memory deallocation decision part 109 executes the processing (the processing shown in FIG. 6) at the time point of FIG. 9, the external heap memory 112 cannot be deallocated, because there is a reference (the arrow 909) to the data R3 (the reference numeral 904) from the data A (the reference numeral 901) and both of the processing 603 and the processing 604 yield "Yes." If the external heap memory deallocation decision part 109 executes the processing (the processing shown in FIG. 6) in the state shown in FIG. 10, however, the external heap memory 112 can be judged to be capable of being deallocated, because there is no reference to the starting point data R3 and consequently at least one of the processing 603 and the processing 604 yields "No" and the processing 605 is executed.

In the processing method shown in FIG. 8, all of the garbage collected areas obtained by the division become processing objects. However, the processing shown in FIG. 8 conducted by the unnecessary data decision part 108 is processing for effectively applying the algorithm of the external heap memory deallocation decision part 109 shown in FIG. 6. It suffices to make the unnecessary data decision on a place where data (the data A (the reference numeral 701) in FIG. 7 or the data A (the reference numeral 901) in FIG. 9) that references starting point data (for example, the data R1 (the reference numeral 704) or the data R2 (the reference numeral 707) in FIG. 7 or the data R3 (the reference numeral 904) in FIG. 9) associated with each external heap memory 112 is disposed.

Information concerning the place where the data A (the reference numeral 701) or the data A (the reference numeral 901) is disposed can be obtained when generating an object associated with the external heap memory 112 shown in FIGS. 3 to 5. Taking FIG. 3 as an example, starting point data is data in the HashMap class as indicated in the place denoted by the reference numeral 302, and the present data is generated by the "test" method in the "Sample" class as indicated in the place denoted by the reference numeral 303. It is possible to memorize the data arrangement of the "Sample" class at that time and utilize it when the processing shown in FIG. 8 is conducted by the unnecessary data decision part 108.

Figure 11:
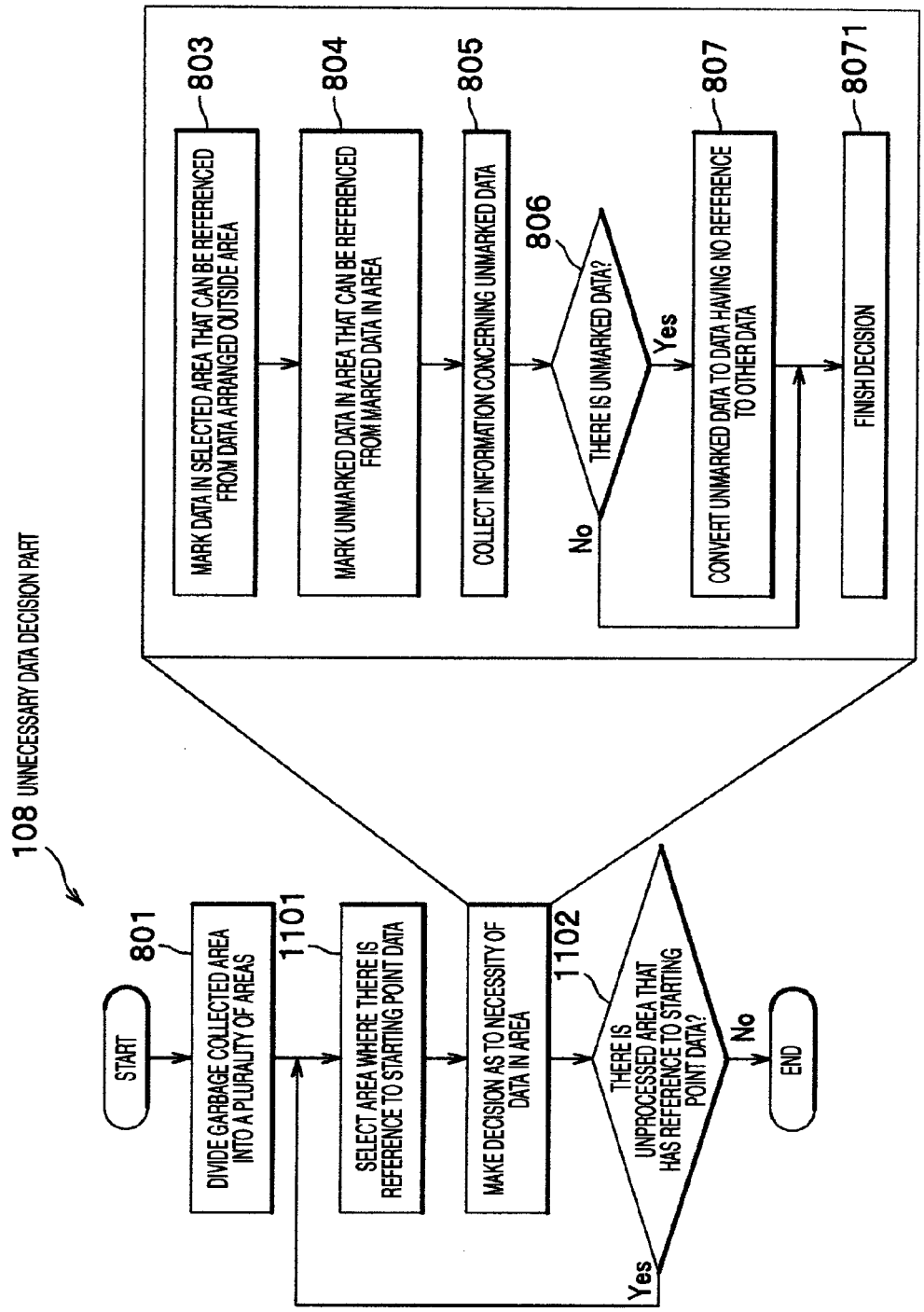
FIG. 11 is a diagram showing a flow chart of an algorithm for efficiently making a decision as to necessity of data that involves division of a garbage collected area.

FIG. 11 shows a flow chart of its algorithm. The flow chart shown in FIG. 11 differs from the flow chart shown in FIG. 8 in that selection of one of areas obtained by the division in the processing 802 is changed to selection of an area where there is data that references starting point data as indicated in processing 1101. As a result, as for the processing 808 as well, a decision is made whether there is an unprocessed area that has a reference to the starting point data as indicated in processing 1102. They will be described with reference to FIG. 12.

Figure 12:
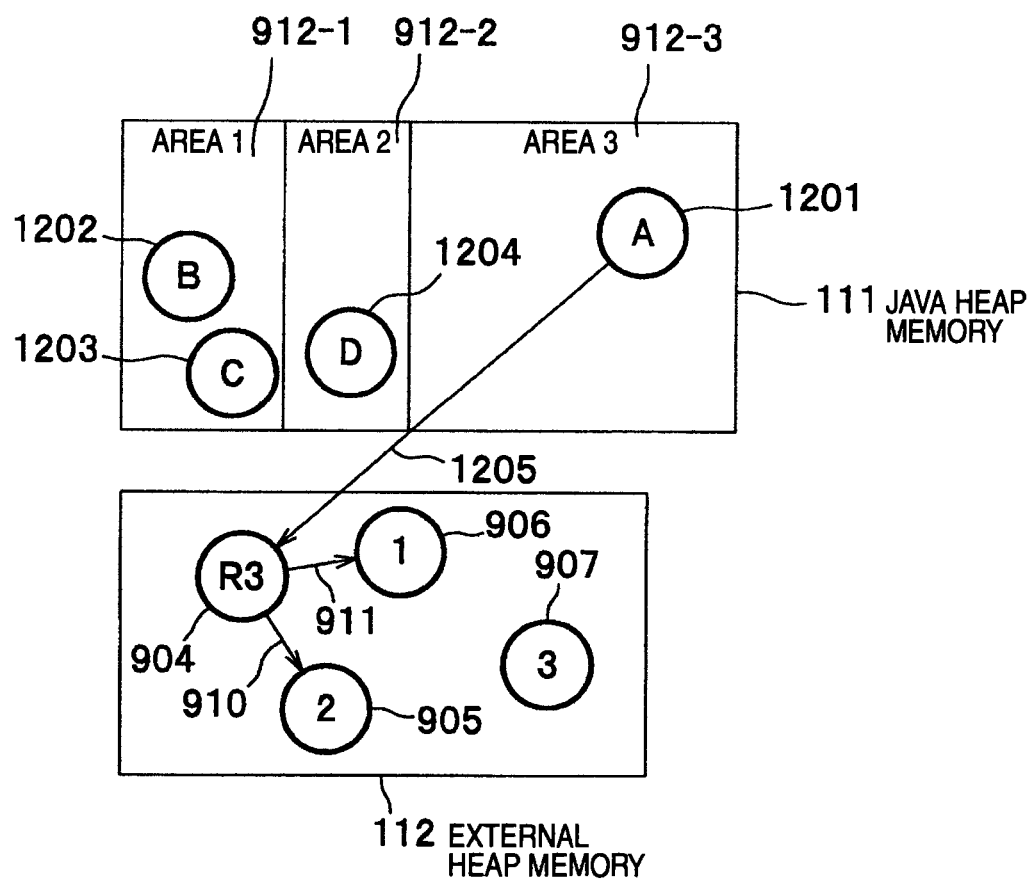
FIG. 12 is a diagram showing an example of data arrangement in a Java heap memory and an external heap memory.

In FIG. 12, data arrangement in the Java heap memory 111 is different as compared with FIG. 9. There is data A (reference numeral 1201) in the area 3 (the reference numeral 912-3). There is a reference (an arrow 1205) to the data R3 (the reference numeral 904) from the data A. Furthermore, data B (reference numeral 1202) and data C (reference numeral 1203) are present in the area 1 (the reference numeral 912-1), and data D (reference numeral 1204) is present in the area 2 (the reference numeral 912-2).

When generating the data R3 (the reference numeral 904), the processing in the flow chart shown in FIG. 11 is applied supposing that the Java virtual machine 105 retains arrangement information of the data A (the reference numeral 1201) that references (the arrow 1205) the data R3 (the reference numeral 904). In the processing 1101, the area 3 (the reference numeral 912-3) is selected, because a place where data having a reference to starting point data (R3 (the reference numeral 904)) in the areas 1 to 3 is present is only the area 3 (the reference numeral 912-3). Upon executing the processing 803 to 8071, the data A (the reference numeral 1201) can be converted to different data having no reference (the arrow 1205) to the data R3, because there is no reference to the data A. And it can be judged (No) in the processing 1102 that there isn't an area where data having a reference to the starting point data (R3 (the reference numeral 904)) is present, and the processing is finished.

If the processing shown in the flow chart in FIG. 6 and conducted by the external heap memory deallocation decision part 109 is applied in this state, then it can be judged that the external heap memory 112 can be deallocated (at least one of the processing 603 and the processing 604 yields "No" and the processing 605 is executed). If the processing of the flow chart shown in FIG. 8 is applied, references to the data B to D which are present in the areas 1 and 2 are also checked. If the processing of the flow chart shown in FIG. 11 is applied, however, it is not necessary to check these areas, resulting in a high efficiency.

Figure 14:
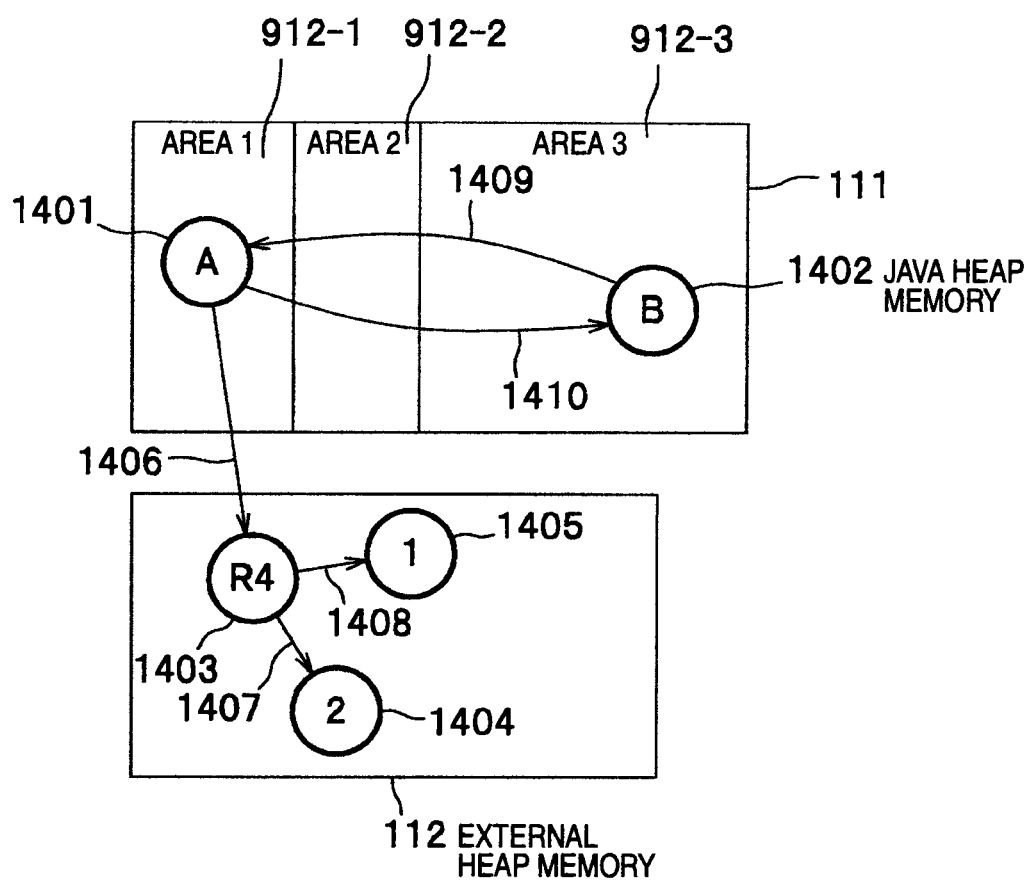
FIG. 14 is a diagram showing an example of data arrangement in a Java heap memory and an external heap memory.

It is now supposed that a garbage collected memory is divided into small areas and data in a certain area and data in a different area are in a mutual reference state. Even if a decision is made as to the necessity of those data in the processing 803 to 8071 shown in FIG. 8, those data are not judged to be unnecessary. For example, it is supposed that the garbage collected Java heap memory 111 is divided into three areas 1 to 3 respectively denoted by reference numerals 912-1 to 912-3 and data A (reference numeral 1401) and data B (reference numeral 1402) are disposed in the area 1 and the area 3, respectively. Other data (reference numerals 1403 to 1405) and references (arrows 1407 and 1408) are shown in FIG. 14.

The processing of the flow chart shown in FIG. 8 is applied to this state. First, upon checking a reference to data in the area 1, a reference (an arrow 1409) to the data A from the data B in the area 3 is detected. Therefore, the data A is judged to be necessary in later execution (marked in the processing 803). Then, upon checking a reference to data in the area 3, a reference (an arrow 1410) to the data B from the data A in the area 1 is detected. Therefore, the data B is also judged to be necessary in later execution (marked in the processing 803).

If the data A is moved into the same area as the data B or the data B is moved into the same area as the data A, however, both data A and B can be judged to be unnecessary data (both data A and B are not marked) because there is no reference to the data A or the data B from the outside of the area. As a result, a reference (an arrow 1406) to data R4 from the data A can be removed. Therefore, it can be judged that the external heap memory 112 can be deallocated. If data in the mutual reference state are present in different areas, then the accuracy of the decision as to the necessity of data thus falls remarkably. However, it is appreciated that the decision as to the necessity of data can be made more accurately by making those data present in the same area. A flow chart of its algorithm is shown in FIG. 15.

Figure 15:
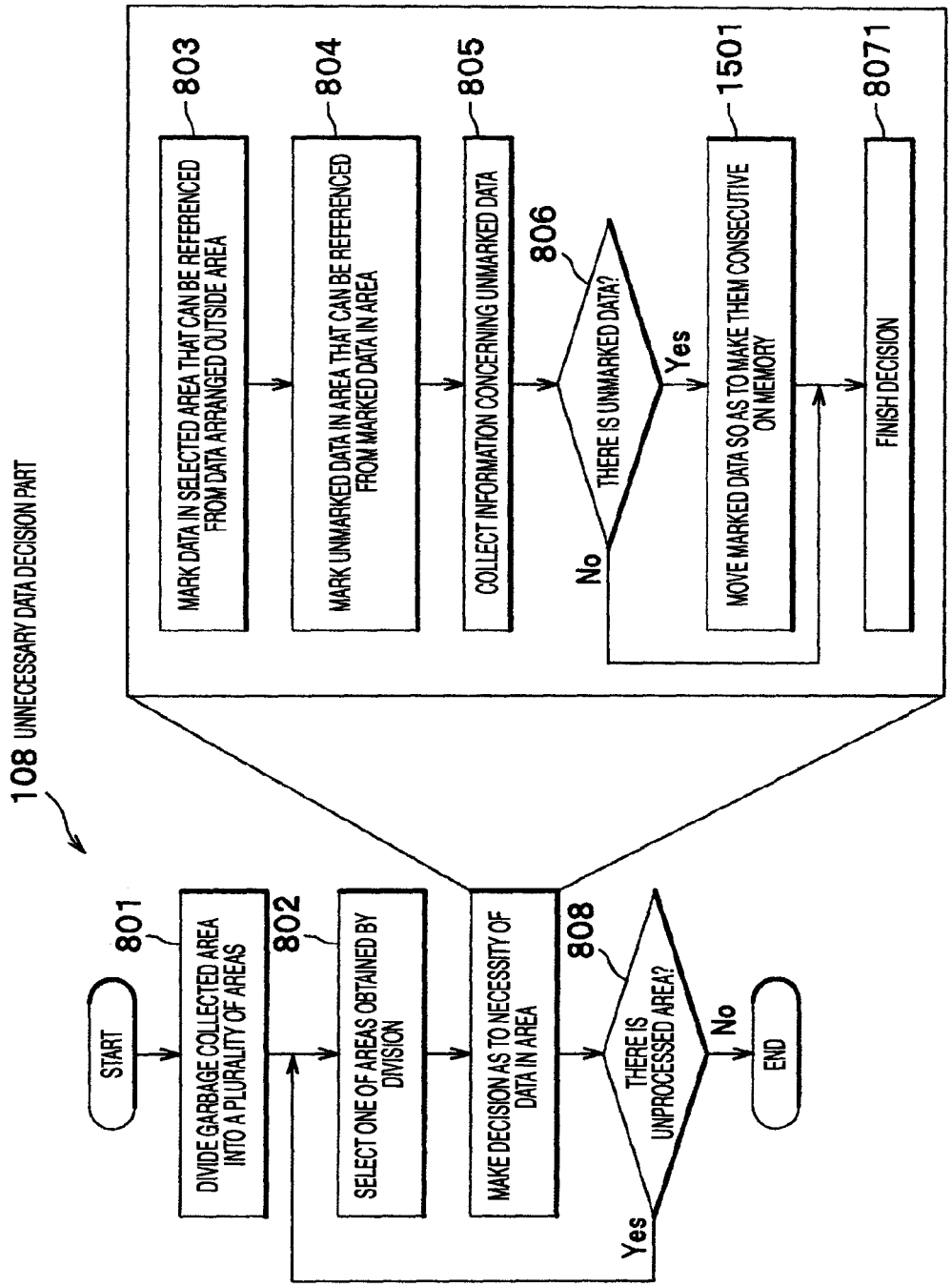
FIG. 15 is a diagram showing a flow chart of an algorithm involving movement of necessary data in making a decision as to necessity of data that involves division of a garbage collected area.

The flow chart shown in FIG. 15 differs from the flow chart shown in FIG. 8 in that the processing 807 is replaced by processing 1501. The processing 807 is processing for converting data that can be judged to be unnecessary to data having no reference to other data. However, the processing 1501 is processing for moving data marked in the processing 803 and the processing 804 so as to make them consecutive on the memory 103. As a result, the data in the mutual reference state are arranged so as to be close to each other, and it is facilitated to arrange them in the same area. An image of the memory 103 obtained after the processing of the flow chart shown in FIG. 15 is applied to the state shown in FIG. 14 is shown in FIG. 16.

Figure 16:
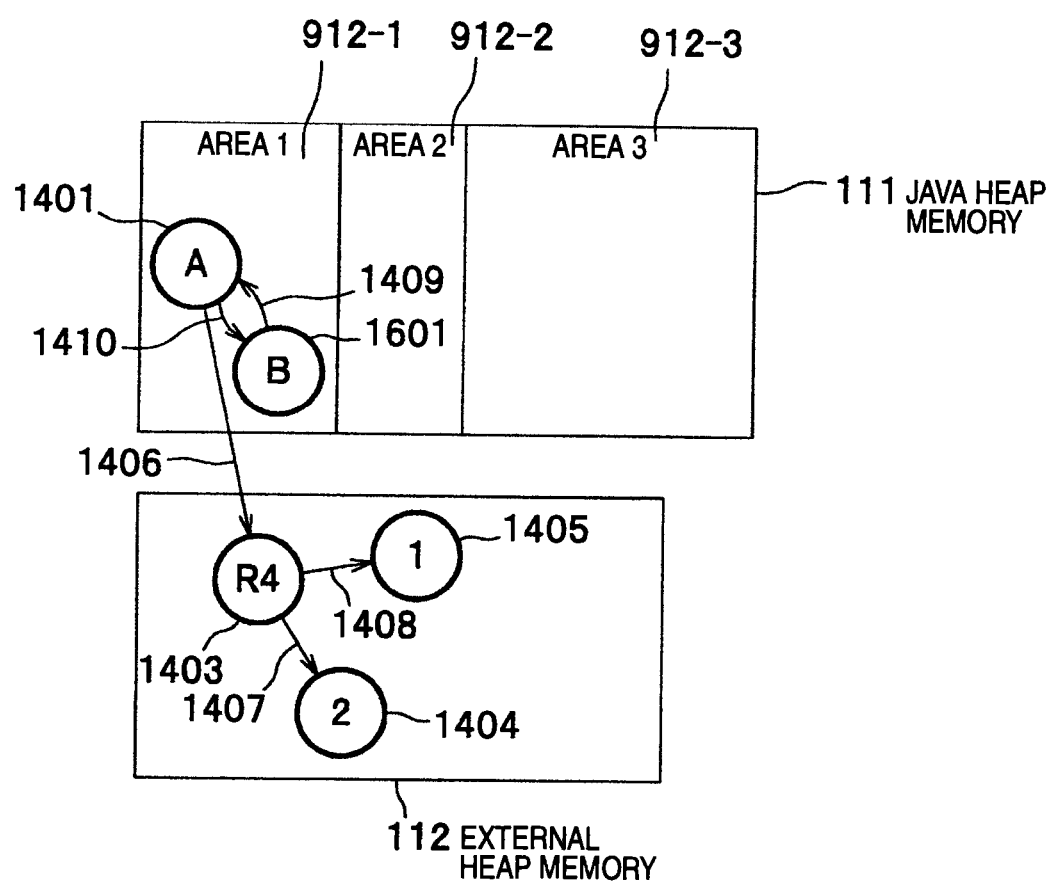
FIG. 16 is a diagram showing a data arrangement obtained after the flow chart shown in FIG. 15 is applied to the data arrangement example shown in FIG. 14.
Figure 17:
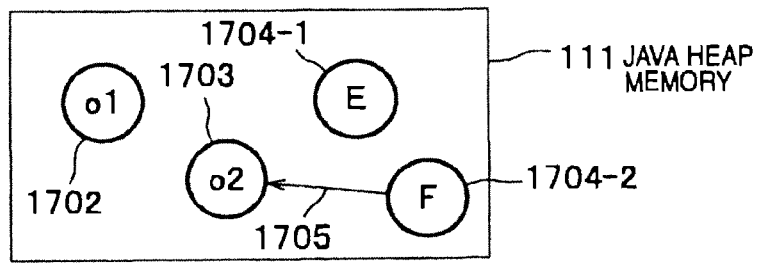
FIG. 17 is a diagram showing an image of memories and data obtained immediately before executing an executable statement indicated in a line 1305 in FIG. 13.
Figure 18:
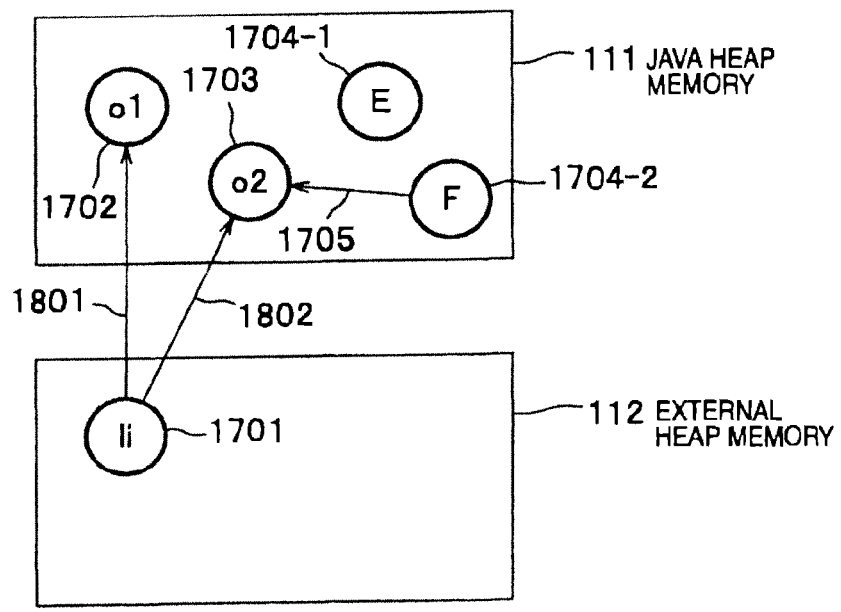
FIG. 18 is a diagram showing an image of memories and data obtained after the executable statement indicated in the line 1305 in FIG. 13 is executed on the state shown in FIG. 17.
Figure 19:
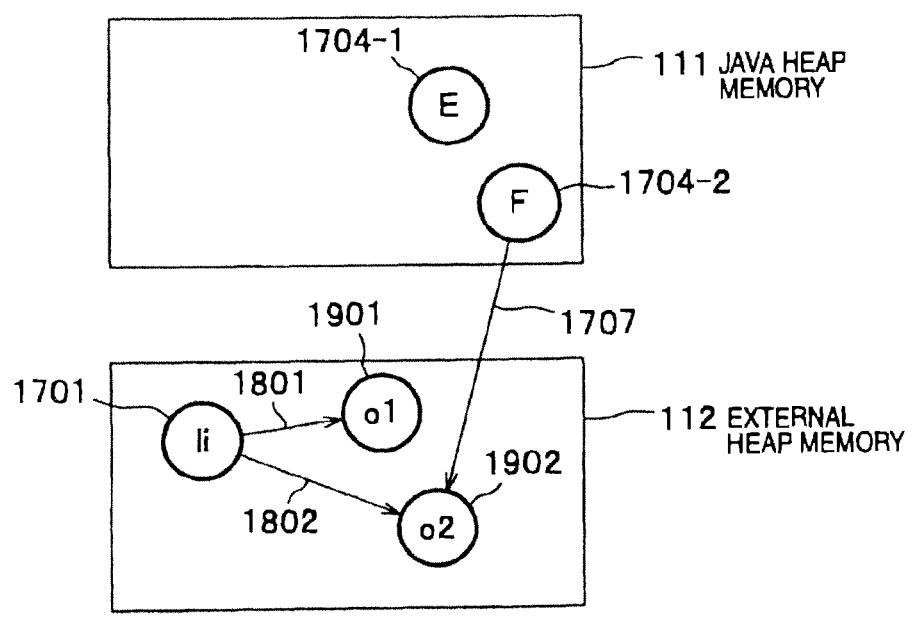
FIG. 19 is a diagram showing an image of memories and data obtained after data o1 and o2 are moved to an external heap memory from a state shown in FIG. 18.
Figure 20:
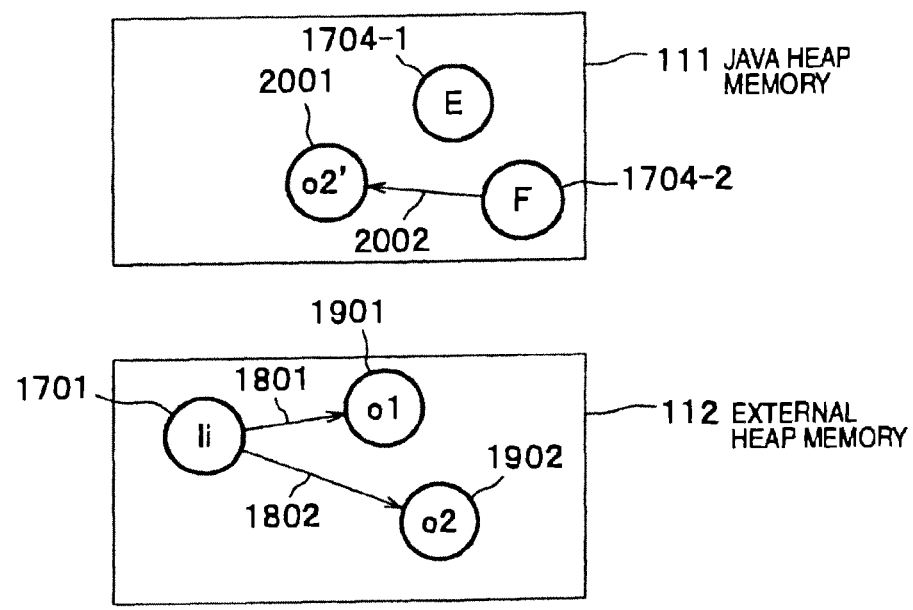
FIG. 20 is a diagram showing an image of memories and data obtained after the data o1 and o2 are moved (copies) to a Java heap memory from a state shown in FIG. 19.

On the space in the memory 103, the Java heap memory 111 shown in FIG. 16 has a lower address on the left side and has a higher address on the right side. In the processing 1501 shown in FIG. 15, a marked object is moved to the lower address side. Since there is no data between the data A and the data B, the data B is moved to the lower address side as indicated by reference numeral 1601 in FIG. 16 and disposed in the same area 1 as the data A. If the unnecessary data decision shown in FIG. 8 is executed in this state, there is no reference to the data A and the data B and consequently both data can be converted to different data having no reference (the processing 807 can be executed). As a result, the reference (the arrow 1406) can be removed. If the processing shown in FIG. 6 is executed by the external heap memory deallocation decision part 109, then it can be judged that the external heap memory 112 can be deallocated.

When managing the memory 103 by using the garbage collection according to the memory management method in the present embodiment, an external heap memory 112 is thus regarded as capable of being deallocated if a reference to data associated with the external heap memory 112 can be judged to be unnecessary. As a result, the external heap memory 112 can be made available without modifying the source program. At that time, the external heap memory 112 is efficiently made capable of being deallocated by dividing the garbage collected Java heap memory 111 into a plurality of areas, making a decision as to the necessity of data for each of the areas obtained by the division, and regarding a reference from data that can be judged to be completely unnecessary in later execution as an unnecessary reference. As a result, references to the external heap memory can be actively decreased, and the number of external heap memories 112 that can be deallocated can be increased.

And the external heap memory 112 becomes available without API description to the source program by using information concerning generation of the external heap memory 112 and data associated with the external heap memory 112, given by an option or an external input file together and thereby automating the reclamation of the external heap memory 112. Accordingly, shortening of the time period for program development and prevention of induction of long time garbage collection caused by a program mistake can be anticipated. In the case where a program modification of an application to which the external heap memory 112 is desired to be applied is not allowed or in the case where the program does not exist, as well, the external heap memory 112 can be applied to more programs while keeping the portability by making the external heap memory 112 available without description of the API.

The embodiments have been described heretofore. However, modes of the present invention are not restricted to them. The concrete configuration and processing can be changed suitably without departing from the spirit of the present invention.

The invention claimed is:

1. A memory management method for managing a memory which secures a first memory area, which is subject to garbage collection, and a second memory area, which is not subject to garbage collection, by using a program executed by a processor in a computer, in a case where the second memory area, which is not subject to garbage collection, comprises starting point data on the reference relation related to the second memory area and other data which are not the starting point data, wherein the starting point data refers to first data in a sequence of data referencing;

the method comprising:

judging, using the computer, whether there is at least one reference to the other data arranged in the second memory area and whether there is no reference to the starting point data in the second memory area by data arranged outside the second memory area, and judging, using the computer, the second memory area to be capable of being deallocated when it is judged that there is at least one reference to the other data arranged in the second memory area; and there is no reference to the starting point data in the second memory area by the data arranged outside the second memory area.

2. The memory management method according to claim 1, wherein information concerning the other data arranged in the second memory area is acquired by using a starting option or an external input file of the program.

3. The memory management method according to claim 1, wherein the step of judging the second memory area to be capable of being deallocated is carried out when the garbage collection is finished.

4. The memory management method according to claim 1, wherein the step of judging the second memory area to be capable of being deallocated is carried out at a beginning of the program or when an actual use quantity of the memory has exceeded a threshold concerning the use quantity of the memory described in an external input file.

5. The memory management method according to claim 1, wherein the step of judging the second memory area to be capable of being deallocated comprises:

when data that reference the starting point data are arranged in an area outside the second memory area, determining whether the data that reference the starting point data are necessary data, wherein the necessary data are data which are directly or indirectly referenced by data arranged in another area; and when the data that reference the starting point data are determined not to be the necessary data, judging the data that reference the starting point data as unnecessary data to judge the second memory area to be capable of being deallocated.

6. The memory management method according to claim 5, wherein the step of determining whether the data that reference the starting point data are the necessary data is carried out when garbage collection is finished.

7. The memory management method according to claim 5, wherein the step of determining whether the data that reference the starting point data are the necessary data is carried out at a beginning of the program or when an actual use quantity of the memory has exceeded a threshold concerning the use quantity of the memory described in an external input file.

8. The memory management method according to claim 5, wherein the step of determining whether the data that reference the starting point data are the necessary data comprises:

dividing, using the computer, the first memory area into at least two divisional areas;

checking, using the computer, whether respective data of the divisional areas are referenced from data arranged in other divisional areas; and determining, using the computer, data in a divisional area, which may not be directly or indirectly referenced from the data in the other divisional areas as unnecessary data.

9. The memory management method according to claim 8, further comprising determining, using the computer, whether the divisional area including data that reference the other data arranged in the second memory area is an area that is capable of being deallocated.

10. The memory management method according to claim 8, wherein sizes of the divisional areas obtained by dividing the first memory area into the at least two divisional areas are described in a starting option or an external input file of the program.

11. The memory management method according to claim 8, wherein when two pieces of data referring to each other in different divisional areas after the first memory area is divided into at least two divisional areas, then at least one piece of the data is moved so as to arrange the two pieces of data in a same divisional area.

12. The memory management method according to claim 1, wherein information concerning a starting option or an external input file of the program is read, and the second memory area is generated by using a result of the reading.

13. A computer comprising:

a memory configured to secure a first memory area which is subject to garbage collection and a second memory area which is not subject to garbage collection therein;

a processor configured to judge, in a case where the second memory area, which is not subject to garbage collection, comprises starting point data on the reference relation related to the second memory area and other data which are not the starting point data, the starting point data referring to first data in a sequence of data referencing, whether there is at least one reference to the other data arranged in the second memory area, and whether there is no reference to the starting point data in the second memory area from data arranged outside the second memory area, and to judge the second memory area to be capable of being deallocated, when it is judged that there is at least one reference to the other data arranged in the second memory area; and there is no reference to the starting point data in the second memory area from by the data arranged outside the second memory area.

* * * * *